United States Patent [19]

Henriksson

[11] Patent Number: 4,604,050
[45] Date of Patent: Aug. 5, 1986

[54] METHOD OF CLEANING NOZZLES IN A FLUIDIZED BED

[75] Inventor: Erik A. Henriksson, Linköping, Sweden

[73] Assignee: Stal-Laval Turbin AB, Finspong, Sweden

[21] Appl. No.: 584,511

[22] Filed: Feb. 28, 1984

[30] Foreign Application Priority Data

Mar. 2, 1983 [SE] Sweden ................................ 8301148

[51] Int. Cl.$^4$ .............................................. B01J 8/28
[52] U.S. Cl. ...................................... 431/121; 431/170; 431/3; 431/7; 122/4 D; 239/112
[58] Field of Search ................. 431/3, 7, 170, 121; 239/112, 113; 126/163 R, 163 A; 110/245; 122/4 D; 34/57 A, 85

[56] References Cited

U.S. PATENT DOCUMENTS

| | | | |
|---|---|---|---|
| 1,757,023 | 5/1930 | Smith | 239/112 X |
| 2,655,986 | 10/1953 | Pennington | 239/112 X |
| 2,750,681 | 6/1956 | Berry | 34/57 A |
| 2,953,248 | 9/1960 | Troland | 239/112 X |
| 3,633,887 | 1/1972 | Bechthold et al. | 431/170 X |
| 3,881,857 | 5/1975 | Hoy et al. | 431/170 X |
| 3,914,089 | 10/1975 | Desty et al. | 431/7 |
| 4,165,040 | 8/1979 | Beacham et al. | 431/170 X |
| 4,303,023 | 12/1981 | Perkins et al. | 431/7 X |
| 4,321,233 | 3/1982 | Tsuji et al. | 431/7 X |
| 4,336,769 | 6/1982 | Daman | 122/4 D |
| 4,427,375 | 1/1984 | DiRosa | 110/245 |

FOREIGN PATENT DOCUMENTS

1425704 2/1976 United Kingdom ................... 431/7

*Primary Examiner*—Samuel Scott
*Assistant Examiner*—Carl D. Price
*Attorney, Agent, or Firm*—Watson, Cole, Grindle & Watson

[57] ABSTRACT

The combustion gas passages leading to a fluidized bed in a hot water or steam boiler are kept free of deposits which might block them by pulses of gas. The gas pulses may be generated from a pressurized reservoir with periodic or aperiodic openings of a valve in a gas line leading from the reservoir to the passages. Where the bottom of a fluidized bed comprises a pair of plates defining a plenum space therebetween and the combustion gas passages define nozzles extending through the plenum space, combustion air may be fed to the nozzles via the plenum space and the cleaning pulses may also be generated from gas supplied to the plenum space.

6 Claims, 4 Drawing Figures

METHOD OF CLEANING NOZZLES IN A FLUIDIZED BED

BACKGROUND OF THE INVENTION

1. Field of the Invention

The present invention relates to a method of preventing blockage of the nozzles and/or openings forming passages for combustion gases fed to a fluidized bed (e.g. a post-combustion bed in a hot water or steam boiler with two or more fluidizing beds). In such boilers. the bottom of the post-combustion bed can comprise two spaced-apart plates defining a plenum therebetween, the combustion gases passing vertically up through both plates through a nozzle and entraining air or gas from the plenum.

The invention also extends to an improved fluidized bed heating plant.

2. Description of the Prior Art

In known hot water or steam boilers with two or more fluidizing beds, the gases of combustion flow from the lowermost bed (the combustion bed) upwardly through the bed(s) positioned above it. In the bed immediately above the combustion bed (the post-combustion bed), the aim is to achieve final combustion of unburnt residual fuel, which is discharged from the underlying combustion bed. The purpose of the post-combustion bed is to achieve the best possible combustion efficiency.

To enable an efficient combustion of the combustion gases, air (secondary air) is supplied immediately before or in the vicinity of the post-combustion bed. The gas stream from the underlying combustion bed contains varying contents of solid particles in the form of unburnt fuel, ashes or bed material, for example. These entrained particles are intended to be either burnt in the post-combustion bed or to pass through this bed (and any subsequent beds) to be separated in a normal manner from the escaping flue gases in upstream cyclones and/or flue gas filters.

The bed bottom of the post-combustion bed and any subsequent beds is normally formed with openings (usually some form of nozzle arrangement), through which the combustion gases pass at high speed to bring about the necessary fluidization of the bed material (usually sand) in the post-combustion bed. The holes or the nozzles in a bed bottom are normally evenly distributed over the entire bottom plane of the bed.

When particle-contaminated combustion gases pass through the openings or nozzles there is a risk that the entrained solid particles will adhere to the openings or nozzles and cause at least partial blockage of the gas stream. Such problems may, of course, also arise in any fluidizing bed upstream of the combustion bed.

OBJECTS OF THE INVENTION

One object of this invention is to provide a solution to the problem of occasional blockage of combustion air passages in a post-combustion bed.

A further object of the invention is to improve the efficiency of combustion in fluidized steam- or water-boilers using a post-combustion bed, by using periodic pressure shocks to clear impurities from the gas nozzles of the post-combustion bed.

SUMMARY OF THE INVENTION

According to its method aspect, a method of cleaning a combustion gas passage leading to a fluidized bed in which the bottom of the bed comprises two spaced-apart bottom plates defining a plenum space therebetween, the gas passage extending through the two bottom plates and communicating with the plenum space and in which a gas is supplied to the plenum space between the bottom plates, is characterized in that the pressure in the gas in the plenum space is suddenly increased to cause gas to flow into the combustion gas passage and there expand and generate a pressure-energy shock wave, which expels impurity particles from the combustion gas passage.

According to its apparatus, aspect, a fluidized bed heating plant comprises a first fluidized bed bottom support, means to feed a fuel and combustion air to a combustion bed supported on the first bottom, a second fluidized bed bottom support disposed above the first, the second fluidized bed bottom support comprising upper and lower spaced-apart plates defining a plenum space therebetween, a plurality of gas passages extending through the upper and lower plates, each of the gas passages communicating with the plenum space and acting to feed flue gas from the combustion bed as combustion gas to a post-combustion bed fluidized above the upper plate, and pressure-surge generating means to generate a sudde pressure rise in the plenum space such as to expel particles from the gas passages and prevent blockage thereof.

BRIEF DESCRIPTION OF THE DRAWINGS

The invention will be described in greater detail, by way of example, with reference to the accompanying drawings, wherein.

DESCRIPTION OF THE PREFERRED EMBODIMENTS

Figure 1:
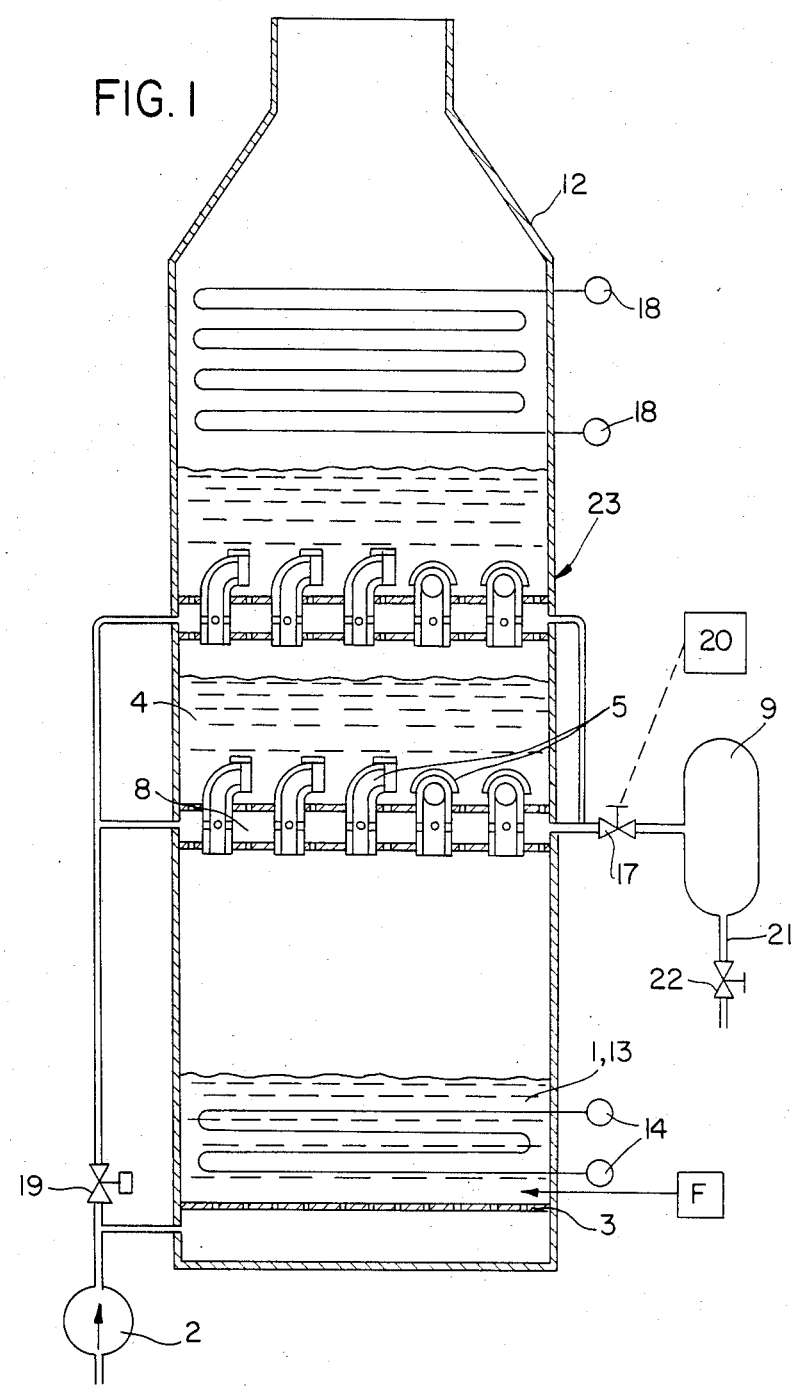
FIG. 1 shows a multi-bed fluidized bed boiler.

FIG. 1 shows a hot water or steam boiler with two fluidizing beds contained within a shell 12. The numeral 1 designates the combustion bed, i.e., the lowermost fluid bed, and it contains sand or other particulate refractory fluidizing material 13, and through this bed cooling tubes 14 extend for passing cooling water through the bed 1. Fuel is supplied to the combustion bed 1 by external mechanical or pneumatic devices (shown schematically at F). The necessary combustion and fluidizing air (the primary air) for the fuel is supplied to the bed 1 from an external fan or compressor 2 through nozzles or other gas openings provided in a bottom 3 of the bed 1. The flue gases, which are created during combustion of the fuel in the bed 1, flow upwards to a post-combustion bed 4 after having passed through gas passages 5 in the bottom of the bed 4.

Figure 2:
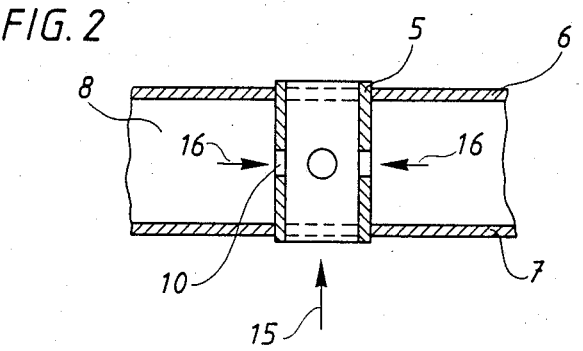
FIGS. 2, 3 and 4 show three different embodiments of combustion gas passage for the bottom of the post-combustion bed in the boiler of FIG. 1.
Figure 3:
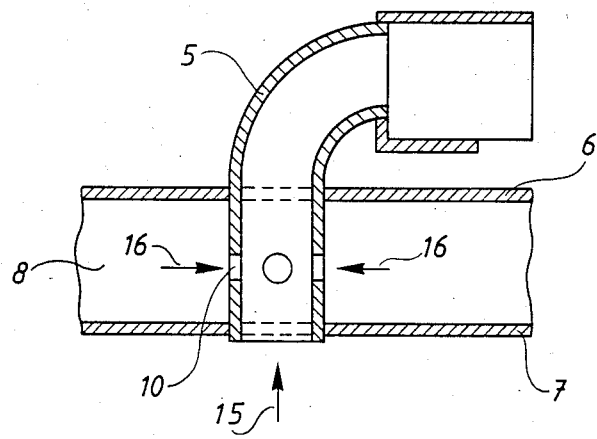
Figure 4:
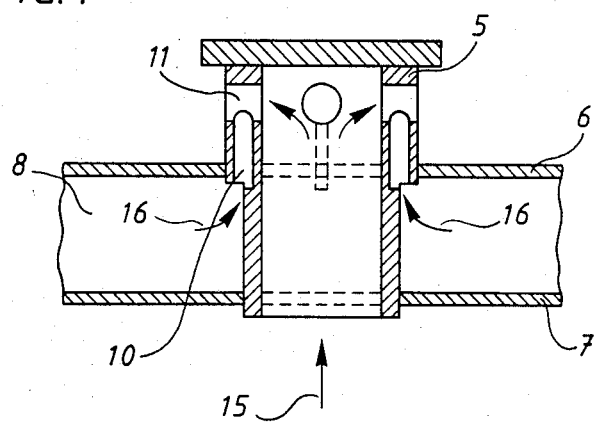

FIGS. 2, 3 and 4 show three currently used forms of combustion gas passages 5 for the bottom of a post-combustion bed 4. The passages, in the form of nozzles 5, extend through an upper plate 6 and a lower plate 7 which together define the bottom of the bed 4. The gap between the plates 6 and 7 forms a plenum space 8, which is in communication, via a shut-off valve 17, with an external air or gas accumulator 9 (see FIG. 1) under supra-atmospheric pressure. Combustion gas is supplied in the direction of the arrow 15 in FIGS. 2 to 4 and cleaning air or gas is supplied to the secondary air in the directions of the arrows 16. The pressure and volume of the accumulator 9 are selected so that, with a completely open communication between the accumulator and the plenum space 8, the pressure in the space 8 is instantaneously raised to an overpressure of between one and a few bars relative to the pressure existing on the flue gas side.

The passages 5 or nozzles 11, are provided with one or more smaller holes 10, through which the plenum space 8 is in communication with the flue gas side. Upon instantaneous pressurization of the air or gas in the space 8, the air or gas flows at greatly increased speed through the holes 10 into the passages 5 or the nozzle openings 11 (see FIGS. 2–4), where it expands and gives rise to a pressure-energy shock wave, which clears obstructions away from the respective passages 5 or nozzle openings 11.

The air or gas from the accumulator 9 is supplied through the valve 17, which can be controlled manually or automatically (via a control means 20) for intermittent operation. The pressure increase can take place periodically or aperiodically.

The accumulator or reservoir 9 can be repressurized following a certain pressure reduction therein via a gas-supply tube 21 and a valve 22.

For after-combustion of the residual fuel in the flue gases, the necessary secondary air may conveniently be supplied through the holes 10. The closed plenum space 8 is then maintained at a certain overpressure relative to the flue gas side (at 15) and is continuously supplied with combustion air from the external fan or compressor. The fan or compressor may (as shown in FIG. 1) be the unit 2 used for the primary air supply to the combustion bed 1, but the secondary air to the post-combustion bed 4 can be derived from a different source. Where a common air source is used, the flow distribution between the two beds can be set by a suitable flow control means, such as the valve 19.

The normal supply of secondary air to the bed 4 thus arrives from the fan or compressor 2, and the pressure shock waves needed for cleaning the passages 5 can be generated by the accumulator 9 using the valve arrangement 17.

By supplying secondary air to each passage 5 or nozzle 11, the air is evenly distributed over the entire bed 4 and is effectively mixed with the flue gases, which increases the combustion efficiency in the bed 4.

The flue gases leaving the bed 4 may still contain enough combustible material to justify the provision of a further post-combustion bed downstream of the bed 4. Any such further post-combustion bed (e.g. such as that shown at 23 in FIG. 1) can have its combustion gas passages kept free from blockage by the method of the invention. The pressure shock waves to keep the gas passages in both beds 4 and 23 clean can be generated simultaneously by a gas release from the reservoir 9 by feeding gas from the valve 17 to plenum spaces in the bottom of both the beds.

The numeral 18 in FIG. 1 designates convection tubes through which water flows to be heated by the exiting flue gases.

The arrangement described above can be varied in many ways within the scope of the following claims.

What is claimed is:

1. In a fluidized bed heating plant which comprises a first chamber means containing a first bed, said first chamber means including a floor defined by upper and lower spaced apart bottom plates which provide a plenum space therebetween; a second chamber means containing a second bed, said second chamber means being in communication with said lower bottom plate; and a plurality of combustion gas passage means extending between said upper and lower bottom plates and communicating said second chamber means with said first chamber means, each of said plurality of combustion gas passage means including at least one hole communicating with said plenum space, the improvement wherein said fluidizing bed heating plant includes supply means for supplying a continuous flow of air to said plenum space so that said air will continuously flow into each of said plurality of combustion gas passage means through said at least one hole and mix with the combustion gas flowing therethrough into said first chamber means, tank means containing a pressurized gas, a fluid line connecting said tank means with said plenum space and a valve in said fluid line, the intermittent opening of said valve causing said pressurized gas to flow into said plenum space and into each of said plurality of combustion gas passage means to generate a pressure-energy shock wave in the combustion gas flowing therethrough, thus causing any impurity particles lodged in each of said plurality of combustion gas passage means to become dislodged and conveyed into said first chamber means, and a control means connected to said valve to automatically control the opening and closing of said valve.

2. The fluidized bed according to claim 1, including feed means for feeding fuel to said second chamber means.

3. The fluidized bed according to claim 1, wherein said supply means comprises an air compressor and a first supply line connecting said air compressor with said plenum space.

4. The fluidized bed according to claim 3, wherein said supply means also includes a second supply line connecting said first supply line to said second chamber means for supplying air to said second chamber means.

5. The fluidized bed according to claim 1, wherein said first chamber means is positioned above said second chamber means.

6. In a fluidized bed heating plant which comprises a first chamber means containing a first bed, said first chamber means including a floor defined by upper and lower spaced apart bottom plates which provide a first plenum space therebetween; a second chamber means containing a second bed, said second chamber means being including a floor defined by upper and lower spaced apart bottom plates which provide a second plenum space therebetween, said second chamber means being in communication with said lower bottom plate of said first chamber means; a third chamber means containing a third bed, said third chamber means being in communication with said lower bottom plate of said second chamber means; a plurality of first combustion gas passage means extending between the upper and lower bottom plates of said first chamber means and communicating said second chamber means with said first chamber means and enabling combustion gas to pass from said second chamber means to said first chamber means, each of said plurality of said first combustion gas passage means including at least one hole communicating with said first plenum space; a plurality of second combustion gas passage means extending between the upper and lower bottom plates of said second chamber means and communicating said third chamber means with said second chamber means and enabling combustion gas to pass from said third chamber means to said second chamber means, each of said plurality of second combustion gas passage means including at least one hole communicating with said second plenum space; the improvement wherein said fluidizing bed heating plant includes tank means containing a pressurized gas, a fluid line connecting said tank means with both said first plenum space and said second plenum space, and a valve in said fluid line, the intermittent opening of said valve causing said pressurized gas to flow into said first and second plenum spaces and into each of said plurality of first and second combustion gas passage means to generate a pressure-energy shock wave in the combustion gas flowing therethrough, thus causing any impurity particles lodged therein to become dislodged and respectively conveyed into said first and second chamber means.

* * * * *